(12) United States Patent
Roettgermann et al.

(10) Patent No.: US 9,678,870 B2
(45) Date of Patent: Jun. 13, 2017

(54) DIAGNOSTIC APPARATUS, CONTROL UNIT, INTEGRATED CIRCUIT, VEHICLE AND METHOD OF RECORDING DIAGNOSTIC DATA

(71) Applicants: Clemens Roettgermann, Munich (DE); Dirk Moeller, Zorneding (DE)

(72) Inventors: Clemens Roettgermann, Munich (DE); Dirk Moeller, Zorneding (DE)

(73) Assignee: NXP USA, Inc., Austin, TX (US)

( * ) Notice: Subject to any disclaimer, the term of this patent is extended or adjusted under 35 U.S.C. 154(b) by 0 days.

(21) Appl. No.: 14/894,550

(22) PCT Filed: Jun. 17, 2013

(86) PCT No.: PCT/IB2013/054956
§ 371 (c)(1),
(2) Date: Nov. 30, 2015

(87) PCT Pub. No.: WO2014/203028
PCT Pub. Date: Dec. 24, 2014

(65) Prior Publication Data
US 2016/0124853 A1    May 5, 2016

(51) Int. Cl.
*G06F 12/08* (2016.01)
*G06F 12/0802* (2016.01)
(Continued)

(52) U.S. Cl.
CPC ........ *G06F 12/0802* (2013.01); *G06F 3/0604* (2013.01); *G06F 3/065* (2013.01);
(Continued)

(58) Field of Classification Search
CPC .... G06F 3/0604; G06F 3/0647; G06F 3/0653; G06F 3/0685; G06F 11/0739; G06F 11/0778
See application file for complete search history.

(56) References Cited

U.S. PATENT DOCUMENTS 7,801,652 B2    9/2010    Regnard De Lagny et al.
8,042,007 B1 *  10/2011   Chan ................... G06F 11/3636
                                                       714/45

(Continued)

OTHER PUBLICATIONS

International Search Report and Written Opinion correlating to PCT IIB2013/054956 issued on Mar. 20, 2014.
http://www.energie-und-technik.de/fileadmin/media/whitepaper/files/NXP_MCU_Debug.pdf.

*Primary Examiner* — Edward Dudek, Jr.

(57) ABSTRACT

A diagnostic apparatus comprises a diagnostic data buffer constituting a volatile memory, and a non-volatile memory capable of receiving data from the buffer. A data buffer controller is also provided and is operably coupled to the buffer and has an event alert input and a data channel monitoring input for receiving diagnostic data. The buffer receives, when the state of a buffer status memory indicates that the buffer is in an unprotected state, at least part of the diagnostic data received by the controller via the data channel monitoring input to the buffer and the controller sets the state of the buffer status memory to indicate the protected state in response to receipt of an event alert received via the event alert input. A controller monitors the buffer status memory and copies a portion of the buffer to the non-volatile memory in response to the buffer status memory being set to be indicative of the protected state.

17 Claims, 2 Drawing Sheets

(51) Int. Cl.
*G06F 11/07* (2006.01)
*G06F 3/06* (2006.01)

(52) U.S. Cl.
CPC .......... *G06F 3/0647* (2013.01); *G06F 3/0653* (2013.01); *G06F 3/0685* (2013.01); *G06F 11/0739* (2013.01); *G06F 11/0778* (2013.01); *G06F 2212/202* (2013.01); *G06F 2212/221* (2013.01); *G06F 2212/60* (2013.01)

(56) References Cited

U.S. PATENT DOCUMENTS

| 9,088,433 B2 | 7/2015 | Roettgermann et al. |
| 2011/0066800 A1 | 3/2011 | Song et al. |
| 2011/0173496 A1 | 7/2011 | Hosek et al. |
| 2011/0202780 A1 | 8/2011 | Ko |
| 2012/0035800 A1 | 2/2012 | Roberts |

* cited by examiner

DIAGNOSTIC APPARATUS, CONTROL UNIT, INTEGRATED CIRCUIT, VEHICLE AND METHOD OF RECORDING DIAGNOSTIC DATA

FIELD OF THE INVENTION

This invention relates to a diagnostic apparatus, a control unit, a vehicle, an integrated circuit and a method of recording diagnostic data.

BACKGROUND OF THE INVENTION

It is known to provide fault detection capabilities in integrated circuits so that faults can be detected "in the field", i.e. when the integrated circuit is employed in an application. Such a facility is of particular, but not exclusive, benefit in the automotive industry, where it is desirable to detect a fault that can have safety implications with respect to the application of the integrated circuit, for example in a vehicle. Corrective or preventative action can then hopefully be taken as a result of detection of the fault.

In this respect, the International Organisation for Standardisation (ISO) provides the ISO 26262 standard, which is a functional standard for road vehicles in order to prevent a hazardous situation arising as a result of automotive electronic and electrical safety-related system malfunctions. As such, a system operating in accordance with the ISO 26262 standard should assess the risk of a hazardous operational situation and execute one or more safety measures to detect and mitigate the effects of random hardware faults. In such circumstances, the system may be put into a so-called "safe state", where for example a slower, reliable, clock may be used for system clocking. Where a system is placed into the safe state, use of logic is limited in order to avoid operation in the safe state generating a fault. The clock speed is also limited. As such, only very limited or no debug capabilities are provided to diagnose the cause of the condition that has caused the system to enter the safe state. The requirement of the system, from a safety perspective, is to enter the safe-state reliably, but not to debug the cause.

For non-safety applications, it is known to provide systems with a diagnostic data logging capability. The "Keystone" series of processors available from Texas Instruments, Inc. comprises a so-called "embedded trace buffer" for the purpose of monitoring application code execution, timing, and data accesses in order to detect bugs and analyse performance of the processors. The embedded trace buffer is an on-chip circular memory buffer for storing compressed trace information. Another known fault monitoring apparatus is the advanced communication controller unit, as described in International Patent publication no. WO 2011/058389, for recording protocol events in FlexRay communications networks for fault analysis purposes.

However, known fault detection apparatus in safety systems have as their primary focus an objective of triggering a transition of a system to a safe state and for reasons stated above such apparatus are not designed to diagnose or debug the cause of a fault. Whilst the embedded trace buffers described above do provide a data recordal capability, only data associated with a single instance of a failure is recorded and detailed data relating to the context of the failure is not recorded.

Such measures do not help the manufacturer of an integrated circuit to determine the cause of a fault. Indeed, the cause of the fault may not be as a result of a random hardware failure, for example an overly sensitive sensor, or a systematic hardware or software failure. Similarly, another example of a cause of the fault can be improper use of the integrated circuit, such as operating the integrated circuit outside the specification defined by the manufacturer. It is, of course, desirable to identify the true cause of the fault and the existing fault detection apparatus do not always enable the manufacturer of the integrated circuit to achieve this aim.

SUMMARY OF THE INVENTION

The present invention provides a diagnostic apparatus, a control unit, a vehicle, an integrated circuit and a method of recording diagnostic data as described in the accompanying claims.

Specific embodiments of the invention are set forth in the dependent claims.

These and other aspects of the invention will be apparent from and elucidated with reference to the embodiments described hereinafter.

BRIEF DESCRIPTION OF THE DRAWINGS

Further details, aspects and embodiments of the invention will be described, by way of example only, with reference to the drawings. In the drawings, like reference numbers are used to identify like or functionally similar elements. Elements in the figures are illustrated for simplicity and clarity and have not necessarily been drawn to scale.

DETAILED DESCRIPTION OF THE PREFERRED EMBODIMENTS

Figure 1:
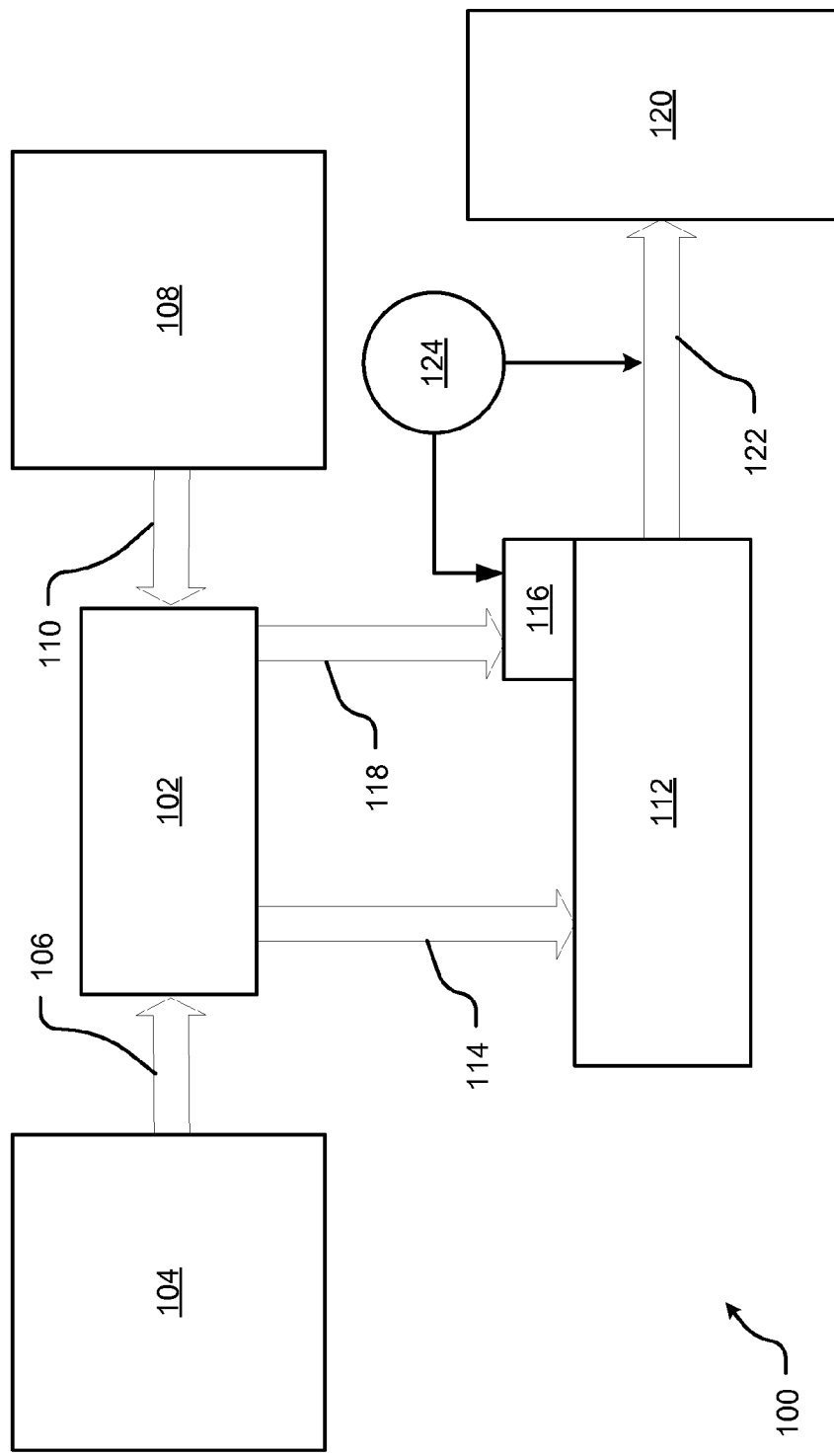
FIG. 1 is a schematic block diagram of a disgnostic apparatus constituting an example of the present invention.

Because the illustrated examples may for the most part, be implemented using electronic components and circuits known to those skilled in the art, details will not be explained to any greater extent than considered necessary for the understanding and appreciation of the underlying concepts of the examples set forth herein and in order not to obfuscate or distract from the teachings herein.

According to a first example, there may be provided a diagnostic apparatus for monitoring a parameter of an integrated circuit; the apparatus may comprise: a diagnostic data buffer constituting a volatile memory; a non-volatile memory capable of receiving data from the diagnostic data buffer; a data buffer controller operably coupled to the diagnostic data buffer and having an event alert input and a data channel monitoring input for receiving diagnostic data; a buffer status memory comprising a state indicative of a protected status and a state indicative of an unprotected status; and a data transfer controller; wherein the diagnostic data buffer receives, when the state of the buffer status memory is indicative of the unprotected state, at least part of the diagnostic data received by the data buffer controller via the data channel monitoring input thereof; the data buffer controller sets the state of the buffer status memory to be indicative of the protected state in response to receipt of an event alert received via the event alert input; and the data transfer controller monitors, when in use, the buffer status memory and copies a portion of the diagnostic data buffer to the non-volatile memory for subsequent analysis in response to the buffer status memory being set to be indicative of the protected state.

The data buffer controller may protect the diagnostic data buffer in response to receipt of the event alert so as to prevent data loss by the diagnostic data buffer.

The data buffer controller may be arranged to prevent transfer of the at least part of the diagnostic data to the diagnostic data buffer in response to receipt of the event alert.

The data transfer controller may unprotect the diagnostic data buffer upon completion of copying of the portion of the diagnostic data buffer to the non-volatile memory.

The data transfer controller may set the state of the buffer status memory to be indicative of the unprotected state upon completion of copying the portion of the diagnostic data buffer to the non-volatile memory.

The diagnostic data buffer may comprise a FIFO buffer. The FIFO buffer may be circular. Indeed, the diagnostic data buffer may comprise more than one FIFO buffer.

The event alert may be an alert that a parameter of a functional component of an integrated circuit may be outside a predetermined specification. The event alert may be an alert concerning the occurrence of a safety event.

The parameter of the functional component of the integrated circuit may be a safety-related parameter and the predetermined specification may relate to a safety state. The parameter may be at least one of: temperature, voltage, clock frequency, memory status, lock-step adherence, a software watchdog trigger, a phase locked loop lock, a Joint Test Action Group (JTAG) controller status, a Built In Self Test (BIST) error, a Direct Memory Access (DMA) error, a flash or digital memory error, Test Control Unit errors, a logic self-test error, a reset, a clock range breach error, an analogue-to-digital converter error and/or a Motor Control clock domain error.

According to a second example, an electronic control unit may comprise the diagnostic apparatus as set forth above in relation to the first example.

The control unit may further comprise a functional component to be monitored operably coupled to the data buffer controller; the function component may generate, when in use, the diagnostic data to be monitored.

The control unit may further comprise a fault detection module operably coupled to the event alert input of the data buffer controller, wherein the fault detection module may receive, when in use, the diagnostic data to be monitored and may comprise a trace analyser and diagnostic logic in order to detect the parameter of the functional component being outside of the predetermined specification.

According to a third example, an integrated circuit may comprise the diagnostic apparatus as set forth above in relation to the first example.

According to a fourth example, a vehicle may comprise the diagnostic apparatus as set forth above in relation to the first example.

According to a fifth example, there may be provided a method of recording diagnostic data; the method may comprise: a data buffer controller receiving data to be monitored and communicating at least part of the data to be monitored to a diagnostic data buffer for temporary storage; the data buffer controller receiving an event alert and setting a state of a buffer status memory to be indicative of a protected state of the diagnostic data buffer in response to receipt of the event alert; and a data transfer controller monitoring the buffer status memory and copying a portion of the diagnostic data buffer to a non-volatile memory for subsequent analysis in response to the buffer status memory being set to be indicative of the protected state of the diagnostic data buffer.

Referring now to FIG. 1, a diagnostic apparatus 100, which can form part of a control unit of a vehicle, for the detection of a fault in an integrated circuit may comprise a data buffer controller 102 that may be operably coupled to a functional component 104 via a first data path 106. The functional component 104 may be a core (not shown), a memory or a clock line. Of course many other examples of the functional component 104 exist and it should be appreciated that the functional component can be any part of an integrated circuit or component of an integrated circuit having a measurable parameter. In this respect, each parameter of a functional component to be monitored constitutes a source of a channel of data. The channel of data can be monitored or "listened to" by direct measurement facilities provided in the integrated circuit or by a "tap" to obtain a copy of the data to be monitored. The first data path 106 may be coupled to the data buffer controller 102 via a data channel monitoring input thereof.

The data buffer controller 102 may also be operably coupled to an event alert module 108 via a second data path 110. The second data path 110 may be coupled to an event alert input of the data buffer controller 102. The event alert module 108 may be any suitable logic, for example a Fault Collection and Control Unit (FCCU) logic, of the integrated circuit arranged to monitor one or more data channels in order to detect a fault condition in relation to one or more parameters to be monitored, for example: temperature, voltage, clock frequency, memory status, lock-step adherence, software watchdog trigger, phase locked loop lock, and/or Joint Test Action Group (JTAG) controller status. Other errors may also be monitored, for example: Built In Self Test (BIST) errors, Direct Memory Access (DMA) errors, flash or digital memory errors, Test Control Unit errors, logic self-test errors, resets, clock range breach errors, such as observed by an independent Clock Monitoring Unit (CMU) in relation to a core clock, an internal crystal clock, an external clock input, or an analogue-to-digital converter, and/or a Motor Control clock domain error.

A diagnostic data buffer 112, which in this example is a volatile memory, is capable of receiving data from the data buffer controller 102 via a third data path 114. The diagnostic data buffer 112 may comprise one or more FIFO buffers, for example one or more circular buffers. In non-volatile memory, the diagnostic apparatus 100 also comprises an allocation for a buffer status memory 116, where a flag can be stored to record a status of the diagnostic data buffer 112, for example protected or unprotected, as a logic HIGH and a logic LOW, respectively. The data buffer controller 102 may be capable of setting the status of the buffer status memory 116 via a fourth data path 118. The diagnostic data buffer 102 is also capable of providing data to a non-volatile memory 120, for example a digital memory, via a fifth data path 122.

A data transfer controller 124 may be provided to control the status of the buffer status memory 116 and copying of data from the diagnostic data buffer 112 to the non-volatile memory 120. The data transfer controller 124 may be software running on the core of the integrated circuit or dedicated logic for the purpose of controlling the status of the buffer status memory 116 and copying data from the diagnostic data buffer 112 to the non-volatile memory 120.

Figure 2:
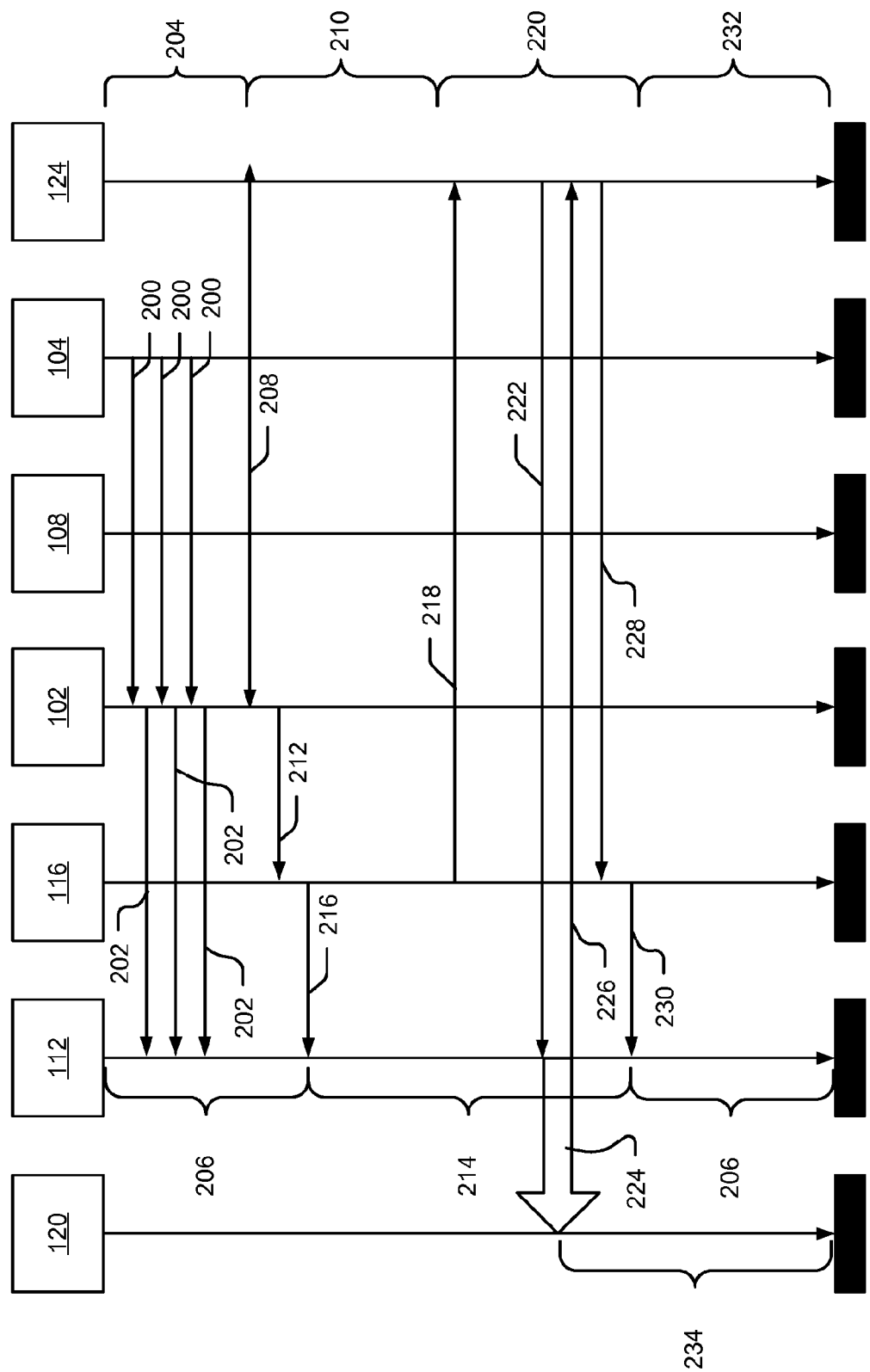
FIG. 2 is an event sequence diagram of a method of recording diagnostic data constituting another example of the invention.

In operation (FIG. 2), diagnostic data concerning and/or provided by the functional component 104 may be received by the data buffer controller 102 via the data channel monitoring inputs thereof (lines 200). As no safety event alerts have been received by the data buffer controller 102 from the event alert module 108, the data buffer controller 102 may communicate or transfer the diagnostic data received to the diagnostic data buffer 112 (lines 202) for temporary storage. At this stage, the integrated circuit may be in a normal operational state (state 204) and diagnostic data may be communicated 206 to the diagnostic data buffer 112. This process may be repeated until the data buffer controller 102 receives (line 208) an event alert via the second data path 110 from the event alert module 108. The event alert may be generated by the event alert module 108 when the event alert module 108 detects, through analysis, that a parameter may be out of specification, for example exceeds or is lower than a predetermined value depending upon the parameter being analysed. In this respect, in order to maintain clarity and conciseness of description and so as not to distract from the salient aspects of the diagnostic apparatus 100, the analysis of the data channels by the event alert module 108 will not be described further herein.

At this stage, the integrated circuit may be about to enter into a safe operational state 210 (state 210) where the integrated circuit implements measures to make the system in which the integrated circuit is used, for example the control unit of the vehicle, transition to a safe state of operation in response to detection of a fault condition by the event alert module 108.

Upon receipt of the event alert, the data buffer controller 102 may set (line 212) the buffer status memory 116 via the fourth data path 118 so as to indicate that the diagnostic data buffer 112 is in a protected state 214. The diagnostic data buffer 112 reads (line 216) the buffer status memory 116 and determines that a protected state has been entered and does not permit further diagnostic data to be recorded in the diagnostic data buffer 112.

During operation, the data transfer controller 124 may monitor the state of the buffer status memory 116 and may obtain the value of the buffer status memory 116 (line 218) periodically. Upon detection by the data transfer controller 124 that the buffer transfer memory 116 has been set to the value indicative of the diagnostic data buffer being in a protected state, the data transfer controller 124 may initiate the operation of transferring data (state 220) from the diagnostic data buffer 112 to the non-volatile memory 120. Thereafter, the data transfer controller 124 may copy (lines 222 and 224) the contents or at least part thereof of the contents of the diagnostic data buffer 112 to the non-volatile memory 120. Once the contents of the diagnostic data buffer 112 have been saved in the non-volatile memory 120, the diagnostic data buffer 112 may communicate (line 226) completion of the data copy to the data transfer controller 124 and, in response thereto, the data transfer controller 124 may set (line 228) the state of the buffer status memory 116 to indicate that the diagnostic data buffer 112 may be in an unprotected state. The state of the buffer status memory 116 may periodically be checked by logic of the diagnostic data buffer 112 (line 230) subsequently and the diagnostic data buffer 112 may then once again permit diagnostic data communicated 206 from the data buffer controller 102 to be stored temporarily in the diagnostic data buffer 112.

It is thus possible to provide a diagnostic apparatus, a control unit, a vehicle, an integrated circuit and a method of recording diagnostic data that provides an ability to analyse diagnostic data that would otherwise be lost upon powering down the integrated circuit. In this respect, diagnostic information is recorded for subsequent retrieval from a non-volatile memory, the recordal being based upon the occurrence of a safety-related event. Analysis of the recorded diagnostic data enables an engineer to carry out post-mortem analysis of the diagnostic data in order to establish whether a fault resulted from a random hardware error or a systematic problem in hardware and/or software. Examples of a systematic problem may be: an incorrect software setup, such as an incorrect clock setup that may lead to so-called "overclocking", a hardware design fault that is only apparent under special conditions, or a hardware fault that occurs when executing certain software functionality. The ability to record the diagnostic data provides information about the context of the fault at the time the fault was detected. Furthermore, it is possible to operate the diagnostic apparatus at the "safe" clock speed as well as a normal operating clock speed.

Of course, the above advantages are examples, and these or other advantages may be achieved by the examples set forth herein. Further, the skilled person will appreciate that not all advantages stated above are necessarily achieved by embodiments described herein.

In the foregoing specification, the invention has been described with reference to specific examples of embodiments of the invention. It will, however, be evident that various modifications and changes may be made therein without departing from the broader scope of the invention as set forth in the appended claims.

The embodiments may be implemented, at least in part, in a computer program for running on a computer system, at least including code portions for performing steps of a method according to the invention when run on a programmable apparatus, such as a computer system or enabling a programmable apparatus to perform functions of a device or system according to the embodiment.

A computer program is a list of instructions such as a particular application program and/or an operating system. The computer program may for instance include one or more of: a subroutine, a function, a procedure, an object method, an object implementation, an executable application, an applet, a servlet, a source code, an object code, a shared library/dynamic load library and/or other sequence of instructions designed for execution on a computer system, for example a batch file.

The computer program may be non-transitory and, for example, may be stored internally on computer readable storage medium. All or some of the computer program may be provided tangibly, for example on a tangible computer readable storage medium permanently, removably or remotely coupled to an information processing system. The tangible computer readable media may include, for example and without limitation, any number of the following: magnetic storage media including disk and tape storage media; optical storage media such as compact disk media (e.g., CD-ROM, CD-R, etc.) and digital video disk storage media; nonvolatile memory storage media including semiconductor-based memory units such as FLASH memory, EEPROM, EPROM, ROM; ferromagnetic digital memories; MRAM; volatile storage media including registers, buffers or caches, main memory, RAM, etc.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures can be implemented which achieve the same functionality. For example, blocks set forth in FIG. 1 can be combined depending upon design convenience and the topology set forth in these figures is not intended to be limiting in any way.

Any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the functionality of the above described operations are merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

The examples set forth herein, or portions thereof, may be implemented as soft or code representations of physical circuitry or of logical representations convertible into physical circuitry, such as in a hardware description language of any appropriate type.

Also, the embodiments set forth herein are not limited to physical devices or units implemented in non-programmable hardware but can also be applied in programmable devices or units able to perform the desired device functions by operating in accordance with suitable program non-transitory code, such as mainframes, minicomputers, servers, workstations, personal computers, notepads, personal digital assistants, commonly denoted as 'computer systems'.

Other modifications, variations and alternatives to the examples set forth herein are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

The invention claimed is:

1. A diagnostic apparatus for monitoring a parameter of an integrated circuit, the apparatus comprising:
   a diagnostic data buffer constituting a volatile memory;
   a non-volatile memory capable of receiving data from the diagnostic data buffer;
   a data buffer controller operably coupled to the diagnostic data buffer and having an event alert input and a data channel monitoring input for receiving diagnostic data;
   a buffer status memory comprising a state indicative of a protected status and a state indicative of an unprotected status; and
   a data transfer controller; wherein
   the diagnostic data buffer receives, when the state of the buffer status memory is indicative of the unprotected state, at least part of the diagnostic data received by the data buffer controller via the data channel monitoring input thereof;
   the data buffer controller sets the state of the buffer status memory to be indicative of the protected state in response to receipt of an event alert received via the event alert input; and
   the data transfer controller monitors, when in use, the buffer status memory and copies a portion of the diagnostic data buffer to the non-volatile memory for subsequent analysis in response to the buffer status memory being set to be indicative of the protected state, wherein the data buffer controller is arranged to prevent transfer of the at least part of the diagnostic data to the diagnostic data buffer when the buffer status memory is in the protected state.

2. An apparatus as claimed in claim 1, wherein the data buffer controller is protects the diagnostic data buffer in response to receipt of the event alert so as to prevent data loss by the diagnostic data buffer.

3. An apparatus as claimed in claim 1, wherein the data transfer controller unprotects the diagnostic data buffer upon completion of copying of the portion of the diagnostic data buffer to the non-volatile memory.

4. An apparatus as claimed in claim 1, wherein the data transfer controller sets the state of the buffer status memory to be indicative of the unprotected state upon completion of copying the portion of the diagnostic data buffer to the non-volatile memory.

5. An apparatus as claimed in claim 1, wherein the diagnostic data buffer comprises a FIFO buffer.

6. An apparatus as claimed in claim 5, wherein the FIFO buffer is circular.

7. An apparatus as claimed in claim 1, wherein the diagnostic data buffer comprises more than one FIFO buffer.

8. An apparatus as claimed in claim 1, wherein the event alert is an alert that a parameter of a functional component of an integrated circuit is outside a predetermined specification.

9. An apparatus as claimed in claim 8, wherein the event alert is an alert concerning the occurrence of a safety event when the apparatus is operating in accordance with the ISO 26262 standard.

10. An apparatus as claimed in claim 8, wherein the parameter of the functional component of the integrated circuit is a safety-related parameter and the predetermined specification relates to a safety state when the apparatus is operating in accordance with the ISO 26262 standard.

11. An apparatus as claimed in claim 8, wherein the parameter is at least one of:
    temperature, voltage, clock frequency, memory status, lock-step adherence, a software watchdog trigger, a phase locked loop lock, a Joint Test Action Group controller status, a Built In Self Test error, a Direct Memory Access error, a flash or digital memory error, Test Control Unit errors, a logic self-test error, a reset, a clock range breach error, an analogue-to-digital converter error and/or a Motor Control clock domain error.

12. An electronic control unit comprising the diagnostic apparatus as claimed in claim 1.

13. A control unit as claimed in claim 12, further comprising a functional component to be monitored operably coupled to the data buffer controller, the function component generating, when in use, the diagnostic data to be monitored.

14. A control unit as claimed in claim 13, further comprising a fault detection module operably coupled to the event alert input of the data buffer controller, wherein the fault detection module receives, when in use, the diagnostic data to be monitored and comprises a trace analyser and diagnostic logic in order to detect the parameter of the functional component being outside of the predetermined specification.

15. A method of recording diagnostic data, the method comprising:
    a data buffer controller receiving data to be monitored and communicating at least part of the data to be monitored to a diagnostic data buffer for temporary storage;
    the data buffer controller receiving an event alert and setting a state of a buffer status memory to be indicative of a protected state of the diagnostic data buffer in response to receipt of the event alert, wherein the data buffer controller is arranged to prevent transfer of the at least part of the diagnostic data to the diagnostic data buffer when the buffer status memory is in the protected state; and
    a data transfer controller monitoring the buffer status memory and copying a portion of the diagnostic data buffer to a non-volatile memory for subsequent analysis in response to the buffer status memory being set to be indicative of the protected state of the diagnostic data buffer.

16. An integrated circuit comprising the diagnostic apparatus as claimed in claim 1.

17. A vehicle comprising the diagnostic apparatus as claimed in claim 1.

\* \* \* \* \*